(12) United States Patent
Wang et al.

(10) Patent No.: US 8,328,434 B2
(45) Date of Patent: Dec. 11, 2012

(54) UNIVERSAL SERIAL BUS (USB) CONNECTOR HAVING AN OPTICAL-TO-ELECTICAL/ELECTRICAL-TO-OPTICAL CONVERSION MODULE (OE MODULE) AND HIGH-SPEED ELECTRICAL CONNECTIONS INTEGRATED THEREIN

(75) Inventors: Tak Kui Wang, Cupertino, CA (US); Chung-Yi Su, Fremont, CA (US); Jesse Chin, Saratoga, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 266 days.

(21) Appl. No.: 12/628,163

(22) Filed: Nov. 30, 2009

(65) Prior Publication Data

US 2011/0123144 A1 May 26, 2011

Related U.S. Application Data

(60) Provisional application No. 61/263,353, filed on Nov. 21, 2009.

(51) Int. Cl.
*G02B 6/36* (2006.01)
(52) U.S. Cl. .................... 385/89; 385/92; 385/14
(58) Field of Classification Search .................... None
See application file for complete search history.

(56) References Cited

U.S. PATENT DOCUMENTS

| | | | |
|---|---|---|---|
| 7,306,380 B2 | 12/2007 | Yamazaki | |
| 8,061,905 B2 * | 11/2011 | Ma et al. ..................... | 385/75 |
| 2005/0180700 A1 * | 8/2005 | Farr ........................... | 385/89 |
| 2009/0067853 A1 | 3/2009 | Cunneen et al. | |
| 2009/0196621 A1 | 8/2009 | Chen | |
| 2009/0216922 A1 * | 8/2009 | Park et al. ................... | 710/63 |
| 2010/0080519 A1 | 4/2010 | Ko et al. ..................... | 385/93 |
| 2010/0226612 A1 * | 9/2010 | Sedio et al. ................. | 385/93 |
| 2011/0262082 A1 * | 10/2011 | Sakurai et al. .............. | 385/89 |
| 2011/0268396 A1 * | 11/2011 | He et al. ..................... | 385/93 |
| 2012/0057867 A1 * | 3/2012 | Lin et al. .................... | 398/43 |

FOREIGN PATENT DOCUMENTS

| | | |
|---|---|---|
| CN | 201204593 Y | 3/2009 |
| WO | 2008/121731 A1 | 10/2008 |

* cited by examiner

*Primary Examiner* — Hemang Sanghavi

(57) ABSTRACT

A USB connector is provided that has an OE module and high-speed electrical connections integrated therein. The OE module includes an optical module, at least one laser diode, at least one photodiode, an optical transceiver IC, and a PCB. The optical module, the laser diode, the photodiode, and the IC are mounted on a surface of the PCB. The OE module is secured within the USB connector. The PCB includes conductive traces and electrical contact pads. The conductive traces electrically connect the IC with the contact pads. The contact pads are electrically connected via through holes formed in the PCB to the high-speed electrical connections, which, in turn, are electrically connected to conductive traces of a motherboard or a computer.

18 Claims, 6 Drawing Sheets

UNIVERSAL SERIAL BUS (USB) CONNECTOR HAVING AN OPTICAL-TO-ELECTICAL/ELECTRICAL-TO-OPTICAL CONVERSION MODULE (OE MODULE) AND HIGH-SPEED ELECTRICAL CONNECTIONS INTEGRATED THEREIN

TECHNICAL FIELD OF THE INVENTION

The invention relates to universal serial bus (USB) connectors, and more particularly, to a USB connector having an optical-to-electrical/electrical-to-optical conversion module (OE module) and associated high-speed electrical connections integrated therein.

BACKGROUND OF THE INVENTION

USB is an external bus standard that specifies the electrical connections and data transfer operations needed to enable electronic devices to interface and communicate with each other. USB is a serial interface that is often used in place of RS232 serial interfaces and parallel interfaces to connect peripheral devices (e.g., mice, keyboards, printers, etc.) to computers (e.g., desktop and laptop computers). Most desktop and laptop computers on the market today are equipped with multiple USB connectors, each of which is designed to mate with a respective USB plug. A typical USB connector is configured with electrical contacts that are designed to couple to electrical contacts external to the USB connector in order to perform data transfer and power supply functions. Some of the electrical contacts of the USB connector are used to couple electrical contacts of a USB plug to the electrical circuitry of the USB connector, whereas some of the electrical contacts of the USB connector are used to couple the electrical circuitry of the USB connector to conductive traces formed on a motherboard of a computer. Electrical traces on the motherboard route electrical signals between the electrical circuitry of the USB connector and electrical circuitry mounted on the motherboard, such as, for example, a USB controller that is connected to a main processor of the computer.

In recent years, owing to the increasing amount of data traffic between computers and their peripheral devices, USB connectors have been equipped to support increasing speeds: e.g., increases from the 10 megabits per second (Mbps) speed provided by the USB1 standard to the 480 Mbps and 5 gigabits per second (Gbps) speeds provided by the USB2 and USB3 standards, respectively. There continues to be a demand for computer-to-peripheral communications that operate at even higher speeds. For example, most high-resolution, real-time video will require data rates above 10 Gbps. At speeds above 10 Gbps, the conventional copper wire connections used for USB devices will become difficult to implement and will have limited reach. Consequently, using an optical connection with backward compatibility to earlier versions of USB connections becomes highly desirable.

In any USB connection implemented in a computer, the data traffic is managed by a USB controller IC mounted on the motherboard of the computer. The controller IC is electrically coupled via traces on the motherboard with the main processor of the computer on one side, and with a physical layer device that conditions the signal for proper transmission on the other side. The physical layer device then connects via traces on the motherboard to the USB connector. In the conventional USB connections, a copper wire based cable is plugged into the USB connector to enable electrical signals to be routed between the computer and its peripheral devices. To introduce an optical connection to the USB connector, an electrical-to-optical/optical-to-electrical conversion module (OE module), which performs the functions of optical-to-electrical conversion and electrical-to-optical conversion, takes the place of the aforementioned physical layer device. In general, two types of arrangements are used for implementing the optical connection. In one of the two types of arrangements, the OE module is mounted on the motherboard through an electrical socket soldered on the motherboard or by direct soldering of the OE module electrical contacts to contact pads on the motherboard. An optical fiber jumper cable is used to provide an optical connection between the OE module and the optical connector inserted in a USB connector receptacle housing that is mounted on the motherboard of the computer. The external USB cable is modified to contain two optical fibers terminated in an optical connector that is inserted inside of the USB plug that terminates the USB cable.

The optical jumper cable has a first connector on a first end thereof, which mates with the USB connector, and a second connector on a second end thereof, which mates with an optical connector that is an integral part of the OE module. The jumper cable typically includes one transmit optical fiber and one receive optical fiber per USB connector. Similarly, the OE module typically includes one laser diode to transmit optical signals and one photodiode to receive optical signals per USB connector. However, if support for multiple USB connections is desired, an OE module can contain multiple laser diodes and an equal number of multiple photodiodes and connect to a jumper cable having the corresponding number of jumper fibers. Electrical contacts of the OE module are electrically coupled via conductive traces on the motherboard to a controller device (e.g., a USB controller IC) mounted on the motherboard. The controller device is electrically coupled via traces on the motherboard to the main processor of the computer.

The OE module includes electrical driver circuitry that receives electrical signals carried on traces of the motherboard from the router and converts them into electrical drive signals that are used to drive the laser diode of the OE module. The corresponding optical signals that are produced by the laser diode are then optically coupled by an optics system of the OE module into the ends of the transmit fiber secured to the second connector of the jumper cable. When optical signals are received in the OE module over the receive fiber of the jumper cable, the optics system of the OE module optically couples the received optical signals onto the photodiode of the OE module. The photodiode produces corresponding electrical signals that are routed from the OE module over traces of the motherboard to the controller device. The controller device then routes the electrical signals over traces of the motherboard to the main processor or another processor of the computer.

In the other of the two types of arrangements, the OE module, which is equipped with an integrated passive optical connector, is contained within the USB connector. This passive optical connector directly couples optical signal to and from the passive optical connector situated inside of the USB plug attached at the end of the aforementioned external optical USB cable. Therefore, no jumper fibers are used in this arrangement. A flex circuit is connected on one end thereof to the OE module and on the opposite end thereof to an electrical connector mounted on the computer motherboard. This electrical connector interfaces the flex circuit with the motherboard. Electrical signals are routed on traces of the motherboard from the main processor to the controller device and from the controller device to the interface of the flex circuit and the motherboard. The electrical signals are then routed over traces of the flex circuit to the OE module contained within the USB connector.

In the OE module, the electrical signals are used to drive the laser diode to produce optical signals. The optical signals produced by the laser diode of the OE module are optically coupled via the optics system of the OE module and the integrated passive optical connector into the passive optical connector contained inside of the USB plug at the end of the transmit fiber contained within the modified optical USB cable. At the opposite end of the transmit fiber, the optical signals are received in the passive optical connector contained within the USB plug, which, in turn, couples the optical signals to the passive optical connector of the OE module contained in the USB receptacle housing; the photodiode inside of the OE module on the opposite end receives the optical signals via the optics system, and the receiver circuitry of the OE module produces the corresponding electrical signals. The electrical signals are then routed over traces of the flex circuit onto traces of the motherboard via the electrical interface between the flex circuit and the motherboard. The electrical signals are then routed over traces of the motherboard to the controller device and then from the controller device to the main processor.

The main disadvantages of the two types of arrangements of the optical connections described above result from the many interfaces that are needed to transfer signals between the USB connector and the controller device mounted on the motherboard. In the arrangement that uses the optical fiber jumper cable, reflection losses, also commonly referred to as Fresnel losses, and additional optical losses caused by misalignment of the optical elements, are possible at each of the optical interfaces. In order to keep the overall USB connector cost down, the ends of the transmit and receive fibers are typically cleaved, but left unpolished, which can result in unpredictable losses occurring at locations where optical signals are coupled into or out of the ends of the fibers. Also, in some cases, a refractive index-matching epoxy is used to attach the fiber ends to an optical element, such as a lens of the optics system. Bubbles can occur at the tip of the optical fiber in the epoxy, which can potentially result in losses occurring at each interface where the optical signal encounters a portion of the bubble (i.e., when the signal encounters the outer surface of the bubble and again when the signal encounters the inner surface of the bubble). Therefore, the use of the optical fiber jumper cable creates many opportunities for optical losses to occur, which can degrade signal quality. While the other type arrangement of the optical connections essentially eliminates the external optical jumper cable, it requires an additional electrical connection for interfacing the flex circuit with the motherboard. This additional electrical connection creates the potential for signal losses and connectivity problems to occur, which can degrade electrical signal quality. In addition, the electrical connection has a cost associated with it that increases the overall cost associated with the USB connector. Also, the manufacturing process involving the flex circuit generally suffers from lower throughput, and possibly more variability than would result using a hard printed circuit board (PCB).

Accordingly, a need exists for a USB connector that has optical capabilities for handling optical signals and which does not require the use of an optical jumper cable or a flex circuit, thereby eliminating the aforementioned problems associated with those types of optical USB arrangements.

SUMMARY OF THE INVENTION

The invention is directed to a USB connector having an OE module and high-speed electrical connections integrated therein. The USB connector comprises a housing, USB electrical circuitry located within the housing, an OE module secured within the housing, high-speed electrical contacts within the housing and connected to the OE module, and high-speed electrical connections having first ends that are connected to the high-speed electrical connections and having second ends that are disposed to be connected to conductive traces of a motherboard of a computer. The OE module comprises a PCB, at least a first IC mounted on a surface of the PCB, at least a first laser diode mounted on a surface of the PCB, at least a first photodiode mounted on a surface of the PCB, and an optical module mounted on a surface of the PCB. The PCB has a plurality of electrically conductive traces formed therein and at least a first set of electrical contact pads disposed on a surface thereof. Electrical contact pads of the first set are connected to the electrically conductive traces formed in the PCB. The optical module has first and second receptacles formed therein for receiving ends of first and second optical fibers, respectively. The optical module includes an optical element configured to couple light between the first receptacle and the first laser diode and between the second receptacle and the first photodiode. The high-speed electrical contacts are disposed within the housing and are electrically coupled to respective electrical contact pads of the first set of electrical contact pads. The high-speed electrical connections are contained at least partially within the housing are electrically coupled on first ends thereof to the high-speed electrical contacts. Second ends of the high-speed electrical connections are disposed outside of the housing to enable the second ends to be electrically coupled to one or more conductive traces of a motherboard of a computer.

The method comprises providing an OE module in a USB connector, providing high-speed electrical connections in the USB connector that are electrically coupled on first ends thereof to electrical contacts of the OE module, and electrically coupling the high-speed electrical connections on second ends thereof to electrically conductive traces of a motherboard of a computer.

These and other features and advantages of the invention will become apparent from the following description, drawings and claims.

DETAILED DESCRIPTION OF AN ILLUSTRATIVE EMBODIMENT

The invention is directed to a USB connector having an OE module and high-speed electrical connections integrated therein. The OE module includes an optical module, at least one laser diode, at least one photodiode, an optical transceiver IC, and a PCB. The optical module, the laser diode, the photodiode, and the IC are mounted on a surface of the PCB. The OE module is secured within the USB connector. The PCB includes conductive traces and electrical contact pads. The conductive traces electrically connect the IC with the contact pads. The contact pads are electrically connected via through holes formed in the PCB to the high-speed electrical connections, which, in turn, are electrically connected to conductive traces of a motherboard or a computer. Integrating the OE module and the high-speed electrical connections into the USB connector in this manner obviates the need for the aforementioned optical jumper cable or the aforementioned flex circuit for interfacing the USB connector to the motherboard of the computer. Consequently, the USB connector has fewer interfaces over which signals have to be transferred, which reduces the likelihood that signal losses will occur. In addition, the configuration of the USB connector reduces the overall costs associated with providing computers with USB connections having optical capabilities.

Figures 2A, 2B:
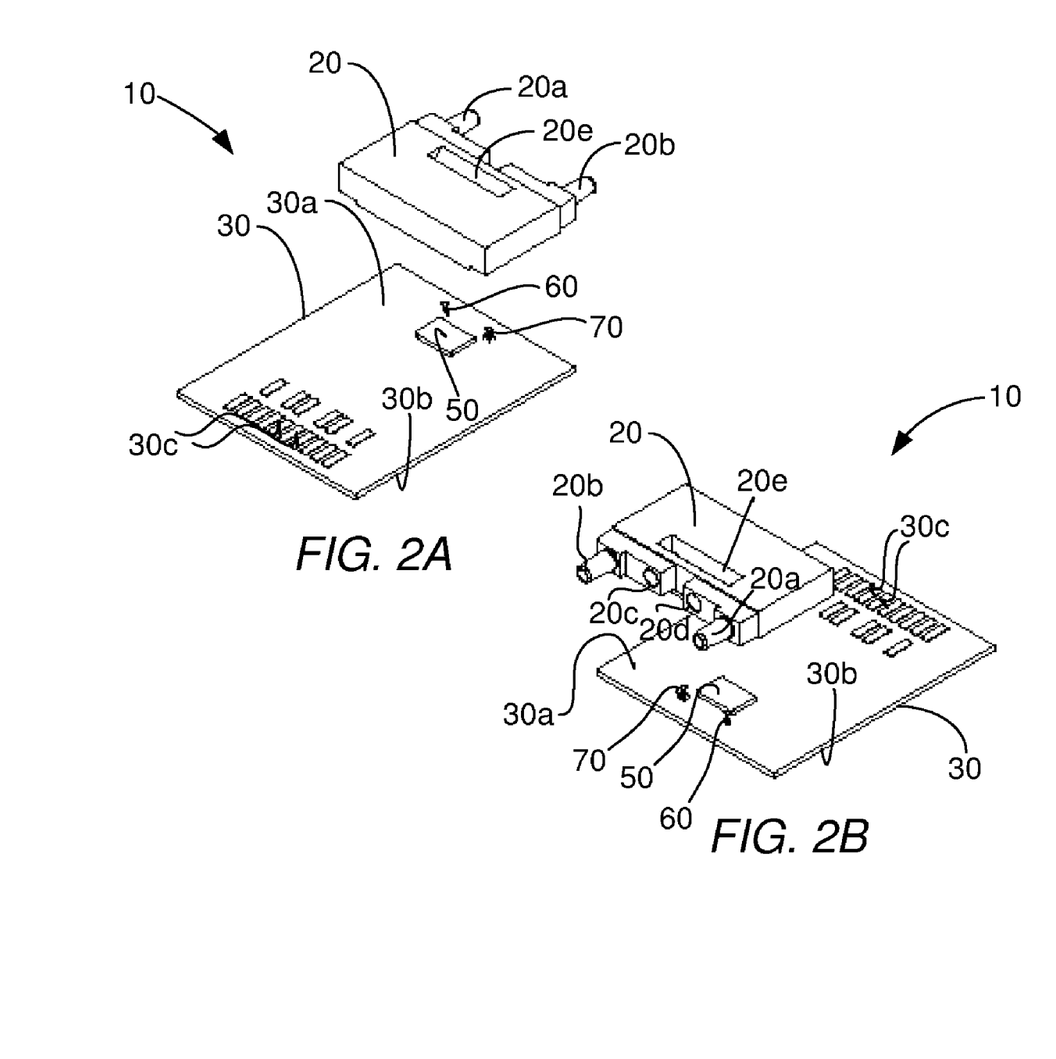
FIGS. 2A and 2B illustrate back and front plan views, respectively, of the OE module before the optical module of the OE module has been attached to the PCB of the OE module.
Figure 3:
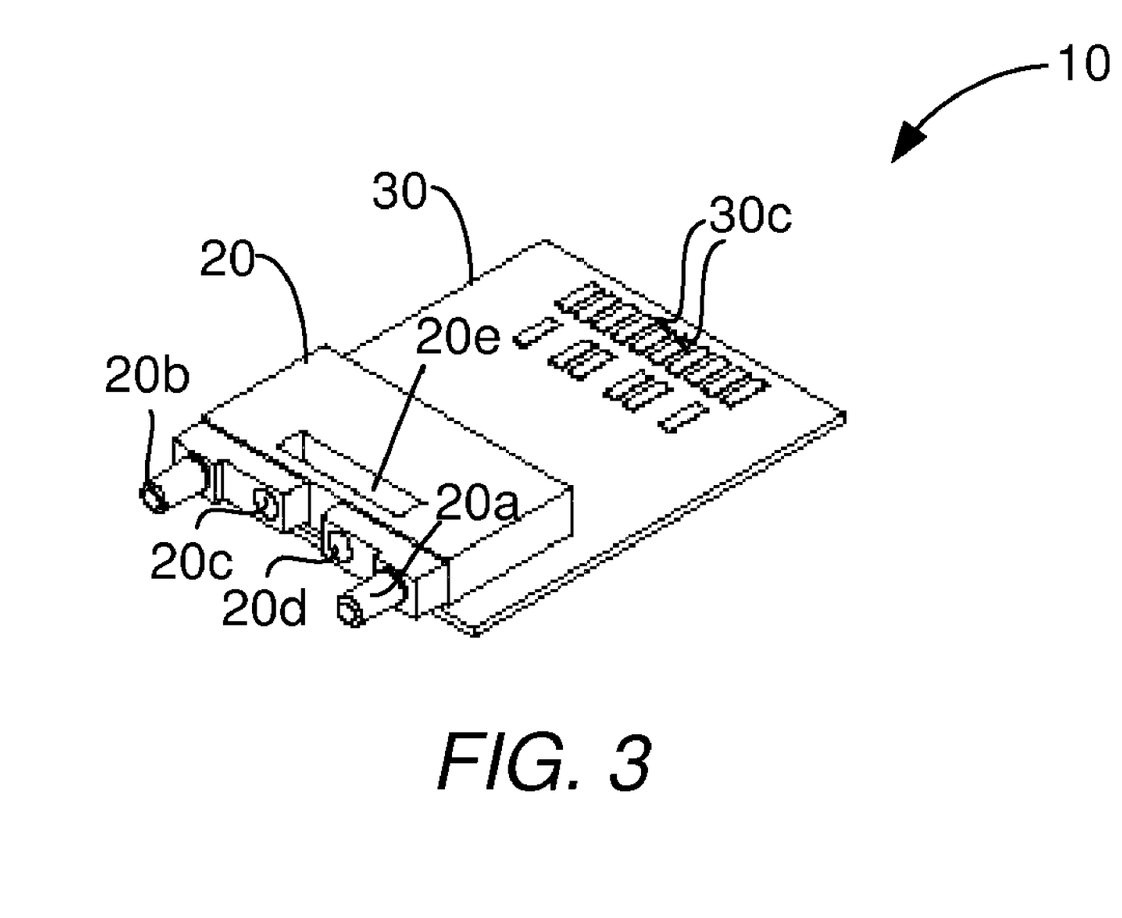
FIG. 3 illustrates a top perspective view of the OE module shown in FIGS. 2A and 2B after the optical module of the OE module has been mounted on the PCB of the OE module.
Figure 4A:
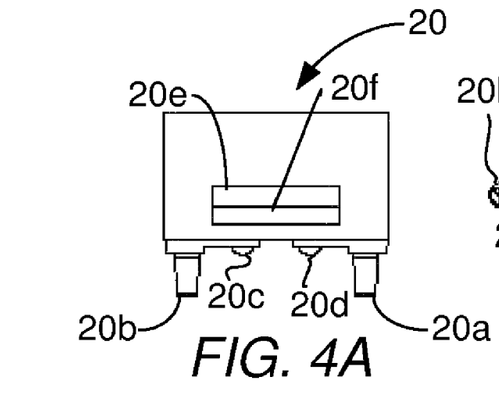
FIGS. 4A-4C illustrate a top plan view, a top perspective view and a bottom plan view, respectively, of the optical module 20 shown in FIG. 3.
Figure 4B:
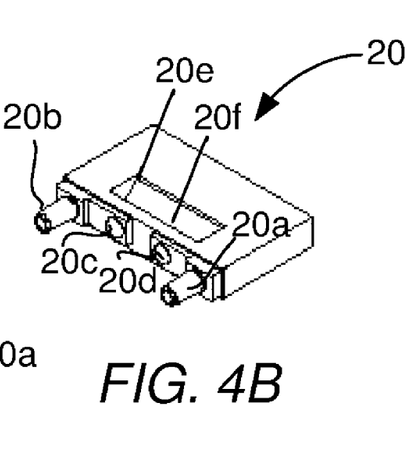
Figure 4C:
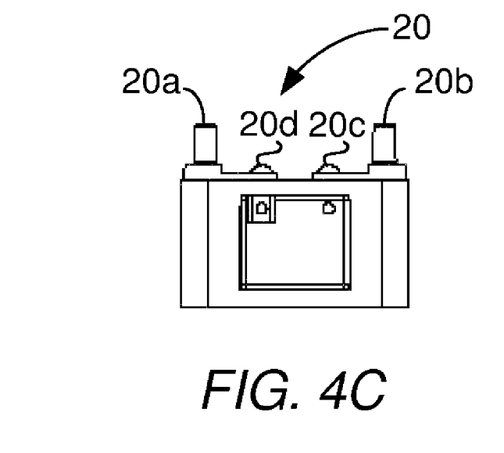
Figure 5:
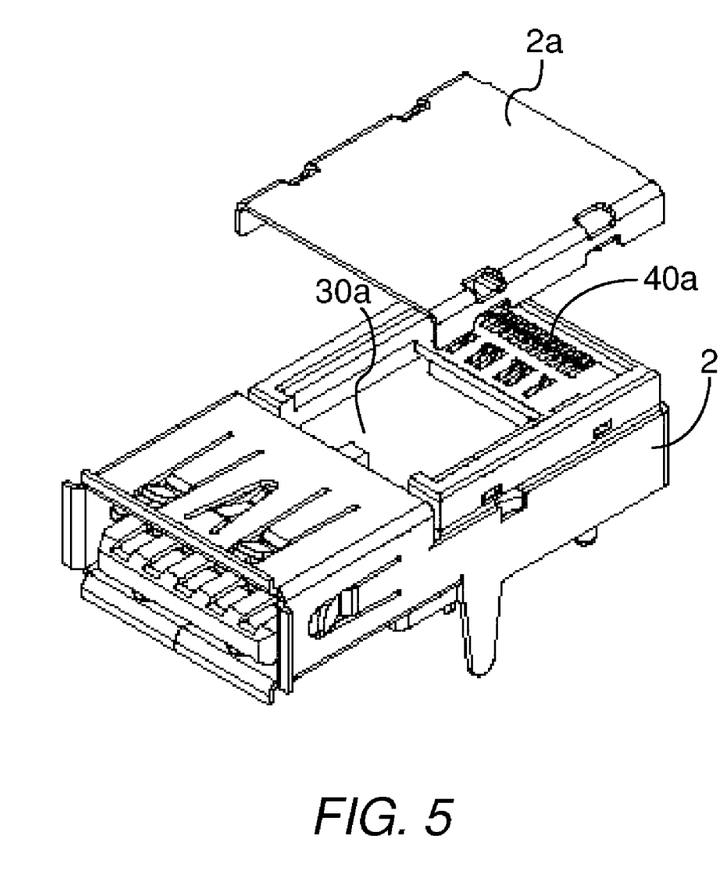
FIG. 5 illustrates a front perspective view of the USB connector shown in FIG. 1A with the lid and the OE module removed from the housing to show electrical contacts of the high-speed electrical connections that interface the PCB of the OE module to a motherboard (not shown) of a computer (not shown).
Figure 6:
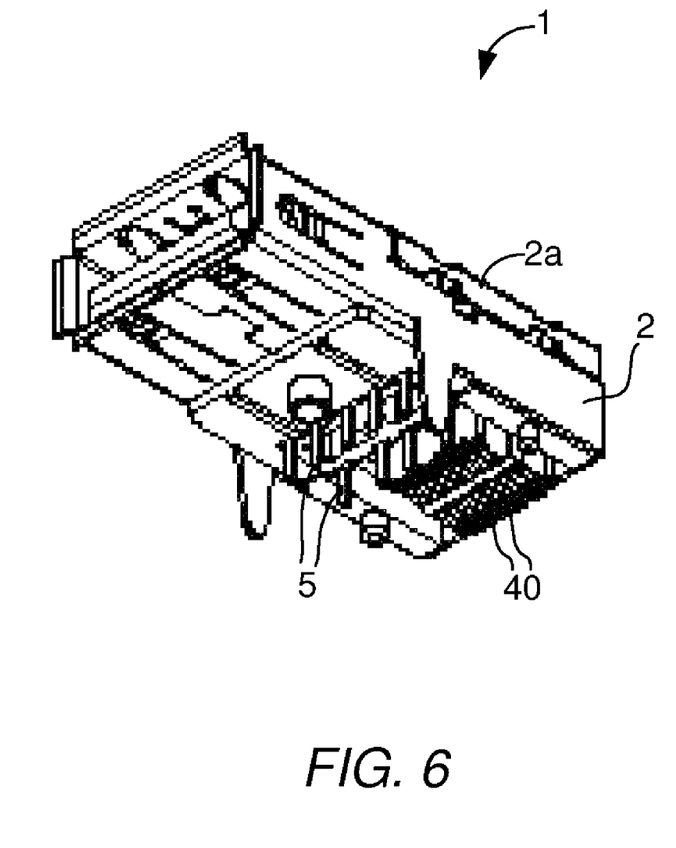
FIG. 6 illustrates a bottom perspective view of the fully assembled USB connector, which shows the high-speed electrical connections that interface the PCB of the OE module to a motherboard (not shown) of a computer (not shown).

FIGS. 1A-1D illustrate various perspective and plan views of the USB connector 1 in accordance with an illustrative, or exemplary, embodiment. FIGS. 1F and 1G illustrate side and front plan views of a lid 2a that attaches to a housing 2 that houses the USB connector 1. FIGS. 2A and 2B illustrate back and front perspective views, respectively, of the OE module 10 before the optical module 20 of the OE module 10 has been attached to an upper surface 30a of the PCB 30 of the OE module 10. FIG. 3 illustrates a front perspective view of the OE module 10 after the optical module 20 of the OE module 10 has been attached to the upper surface 30a of the PCB 30 of the OE module 10. FIGS. 4A-4C illustrate a top plan view, a top perspective view and a bottom plan view, respectively, of the optical module 20 shown in FIG. 3. FIG. 5 illustrates a front perspective view of the USB connector 1 with the lid 2a and the OE module 10 removed to show electrical contacts 40a of the high-speed electrical connections 40 that interface the OE module 10 to a motherboard (not shown) of a computer (not shown). FIG. 6 illustrates a bottom perspective view of the fully assembled USB connector 1, which shows the high-speed electrical connections 40 that interface the OE module 10 to a motherboard (not shown) of a computer (not shown). The USB connector 1 in accordance with the illustrative embodiment will now be described with reference to FIGS. 1A-6.

Figures 1A, 1B, 1C, 1D, 1E, 1F, 1G:
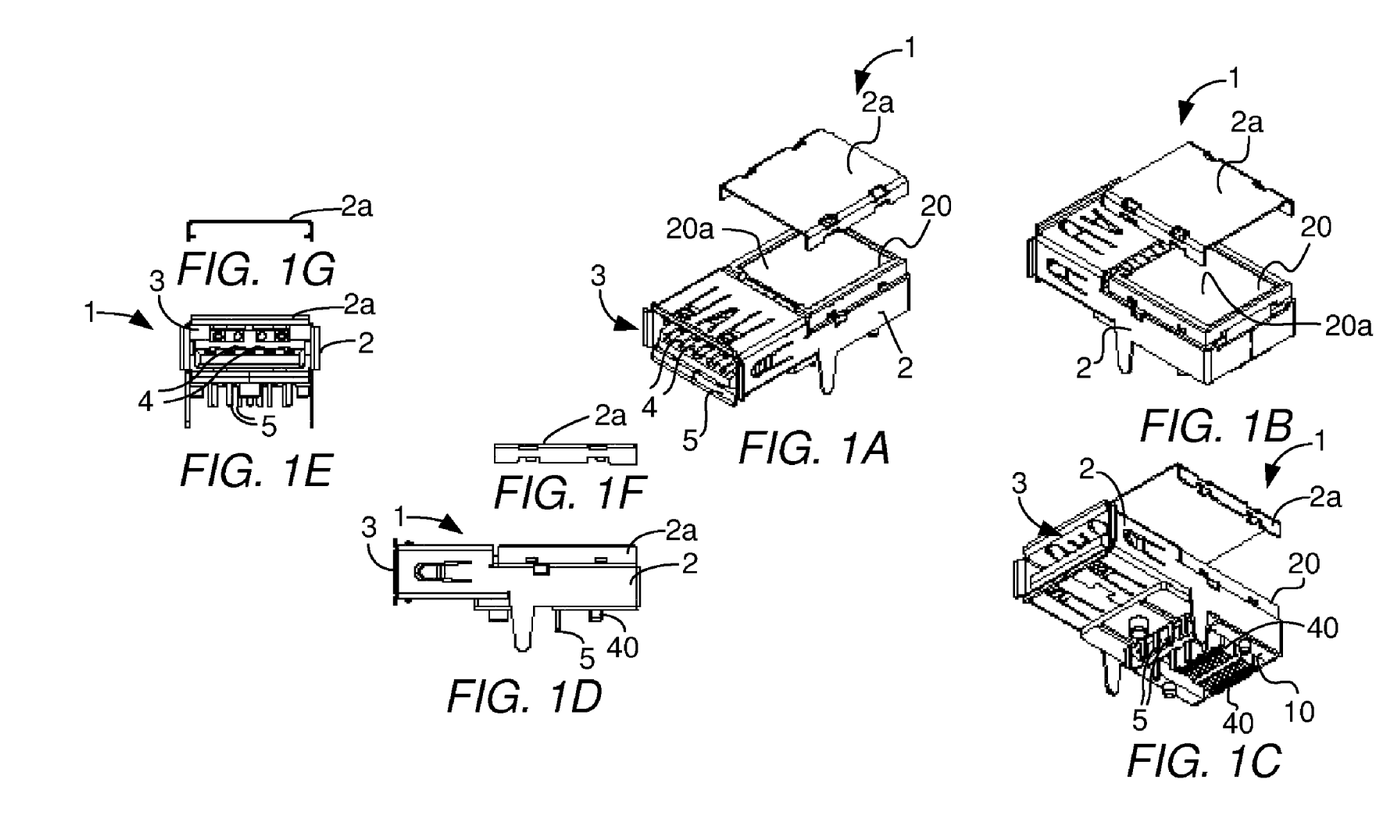
FIG. 1A illustrates a front perspective view of the USB connector, which shows a lid removed from the USB connector housing to reveal the upper surface of the optical module of the OE module of the USB connector.
FIG. 1B illustrates a back perspective view of the USB connector shown in FIG. 1A, which also shows the lid removed from the housing to reveal the upper surface of the optical module of the OE module of the USB connector.
FIG. 1C illustrates a bottom perspective view of the USB connector shown in FIG. 1A, which shows the high-speed electrical connections mounted connected to the PCB of the OE module.
FIG. 1D illustrates a side plan view of the USB connector shown in FIG. 1A, which shows the lid attached to the housing to enclose the portion of the housing that contains the OE module and the high-speed electrical connections.
FIG. 1E illustrates a front plan view of the USB connector shown in FIG. 1A, which shows the receptacle formed in the housing of the USB connector shown in FIG. 1A and the lid attached to the housing.
FIG. 1F illustrates a side plan view of the lid shown in FIG. 1A.
FIG. 1G illustrates a front plan view of the lid shown in FIG. 1A.

FIG. 1A illustrates a front perspective view of the USB connector 1 with the lid 2a removed from the housing 2 to reveal the upper surface 20a of the optical module 20 of the OE module 10. FIG. 1B illustrates a back perspective view of the USB connector 1 with the lid 2a removed from the housing 2 to reveal the upper surface 20a of the optical module 20. FIG. 1C illustrates a bottom perspective view of the USB connector 1, which shows the high-speed electrical connections 40 coupled to the PCB 30. FIG. 1D illustrates a side plan view of the USB connector 1, which shows the lid 2a attached to the housing 2 to enclose the portion of the housing 2 that contains the OE module 10. FIG. 1E illustrates a front plan view of the USB connector 1, which shows the receptacle 3 formed in the housing 2 and the lid 2a attached thereto. FIG. 1F illustrates a side plan view of the lid 2a. FIG. 1G illustrates a front plan view of the lid 2a.

The receptacle 3 is configured to receive a USB plug (not shown). A plurality of electrical contacts 4 are disposed in the receptacle 3 for interfacing the USB connector 1 with electrical contacts (not shown) of a USB plug. A plurality of electrical contacts 5 on the USB connector 1 are used for interfacing electrical circuitry (not shown) of the USB plug (not shown) with conductive traces (not shown) formed on a motherboard (not shown) of a computer (not shown). The PCB 30 has electrical contacts 30c (FIGS. 2A-3) disposed on the upper surface 30a thereof for interfacing the PCB 30 with the electrical contacts 40a (FIG. 4) of the high-speed electrical connections 40 of the USB connector 1. The electrical contacts 40a of the high-speed electrical connections 40 electrically connect the PCB 30 to the motherboard (not shown) of the computer (not shown).

With reference to FIGS. 2A, 2B, 3, and 4A-4C, the optical module 20 of the OE module 10 is mounted on the upper surface 30a of the PCB 30. The OE module 10 also includes a controller IC 50, a photodiode 60, and a laser diode 70, which are mounted on the upper surface 30a of the PCB 30. When the optical module 20 is mounted on the PCB 30, passive alignment devices 20a and 20b of the optical module 20 are contained within openings (not shown) formed in the housing 2 of the USB connector 1 having complimentary shapes to those of the passive alignment devices 20a and 20b. The optical module 20 has openings 20c and 20d formed therein for connecting respective ends of respective transmit and receive optical fibers (not shown) to the optical module 20. When the optical module 20 is positioned on the upper surface 30a of the PCB 30 at the location depicted in FIG. 3, an optical element 20e of the optical module 20 couples light between the laser diode 70 and the end of the transmit fiber and couples light between the photodiode 60 and the end of the receive optical fiber. As can be seen in FIGS. 4A-4C, the optical element 20e comprises a 45° mirror 20f. In accordance with the illustrative embodiment, the laser diode 70 is a vertical cavity surface emitting laser diode (VCSEL) that emits light in a direction that is normal to the upper surface 30a of the PCB 30. The light emitted by the laser diode 70 is received by the 45° mirror 20f and is directed at a 45° angle to the angle of incidence of the light on the mirror 20f toward the opening 20c formed in the optical module 20, which is connected to a transmit optical fiber (not shown). Light received over a receive optical fiber (not shown) connected to the opening 20d formed on the optical module 20 is incident on the mirror 20f at an angle that is generally 0° to the upper surface 30a of the PCB 30. The received light is directed by the mirror 20f at an angle a 45° angle to the angle of incidence of the light on the mirror 20f toward the photodiode 60.

With reference to FIGS. 2A, 2B, 3, 5, and 6, in order to mount the PCB 30 within the housing 2, the PCB 30 is flipped such that the upper surface 30a faces downward in the housing 2, i.e., in a direction away from the lid 2a. In this position, respective electrical contact pads 30c disposed on the PCB 30 come into contact with respective electrical contacts 40a of the high-speed electrical connections 40, thereby placing the IC 50 in electrical contact with the high-speed electrical connections 40. When the USB connector 1 is fully assembled and mounted on the motherboard (not shown) of the computer (not shown), the high-speed electrical connections 40 are in electrical contact with respective conductive traces formed on the motherboard of the computer to enable the OE module 10 to communicate directly with one or more devices (e.g., a USB controller device) mounted on the motherboard of the computer.

It should be noted that the USB connector has been described with reference to a few illustrative embodiments in order to demonstrate the principles and concepts of the invention. It will be understood by persons of ordinary skill in the art, however, that the invention is not limited to these embodiments and that many modifications may be made to these embodiments without departing from the scope of the invention. For example, while the OE module has been described with respect to a particular physical configuration, the OE module may have a variety of different physical configurations (e.g., multiple laser diodes and multiple photodiodes). Likewise, the USB connector housing may have a variety of different physical configurations.

What is claimed is:

1. A universal serial bus (USB) connector comprising:
   a housing having a top portion, a bottom portion, a front portion, and a back portion;
   USB electrical circuitry contained within the housing; and
   an optical-to-electrical/electrical-to-optical conversion module (OE module) secured within the housing, the OE module comprising:
      a printed circuit board (PCB) having a plurality of electrically conductive traces formed therein and having at least a first set of electrical contact pads disposed on a surface thereof, wherein at least some of the electrical contact pads of the first set are connected to at least some of the electrically conductive traces formed in the PCB;
      at least a first integrated circuit (IC) mounted on a surface of the PCB, the first IC having electrical leads that are electrically coupled to one or more of the electrically conductive traces of the PCB;
      at least a first laser diode mounted on a surface of the PCB and electrically connected to the first IC;
      at least a first photodiode mounted on a surface of the PCB and electrically connected to the first IC; and
      an optical module mounted on a surface of the PCB, the optical module having first and second receptacles formed therein for receiving ends of first and second optical fibers, respectively, the optical module including an optical element configured to couple light between the first receptacle and the first laser diode and between the second receptacle and the first photodiode;
      high-speed electrical contacts disposed within the housing, the high-speed electrical contacts being electrically coupled to the first set of electrical contact pads; and
      high-speed electrical connections contained at least partially within the housing, wherein the high-speed electrical connections are electrically coupled on first ends thereof to the high-speed electrical contacts, and wherein second ends of the high-speed electrical connections are disposed outside of the housing to enable the second ends to be electrically coupled to one or more conductive traces of a motherboard of a computer.

2. The USB connector of claim 1, wherein the first IC, the first laser diode, the first photodiode, and the optical module are mounted on an upper surface of the PCB near a first edge of the PCB.

3. The USB connector of claim 2, wherein the first set of electrical contact pads are disposed on the upper surface of the PCB near a second edge of the PCB, wherein the second edge of the PCB is generally parallel to the first edge of the PCB.

4. The USB connector of claim 3, wherein the OE module is secured within the housing in such a way that the upper surface of the PCB faces in a direction toward the bottom portion of the housing, and wherein the high-speed electrical contacts are disposed within the housing at a location between the top surface of the PCB and the bottom portion of the housing, and wherein the second ends of the high-speed electrical connections are disposed outside of the housing adjacent the bottom portion of the housing.

5. The USB connector of claim 4, wherein a bottom surface of the PCB faces in a direction toward the top of the housing, the USB connector further comprising:
   a lid attached to the upper portion of the housing adjacent the bottom surface of the PCB.

6. The USB connector of claim 1, further comprising:
   at least a first passive alignment feature disposed on the optical module; and
   at least a first passive alignment feature disposed in the housing, the first passive alignment features having shapes that are complimentary to one another such that the first passive alignment feature disposed on the optical module mates with the first passive alignment feature disposed in the housing.

7. The USB connector of claim 6, further comprising:
   at least a second passive alignment feature disposed on the optical module; and
   at least a second passive alignment feature disposed in the housing, the second passive alignment features having shapes that are complimentary to one another such that the second passive alignment feature disposed on the optical module mates with the second passive alignment feature disposed in the housing.

8. The USB connector of claim 7, wherein the optical module has a front surface, a back surface, a top surface, a bottom surface, a first side surface, and a second side surface, wherein the first and second receptacles are formed in the front surface of the optical module, and wherein the first and second passive alignment features disposed on the optical module are located on the front surface of the optical module near the first and second side surfaces, respectively, of the optical module, and wherein the first and second receptacles are located in between the first and second alignment features disposed on the optical module.

9. A method for providing a Universal Serial Bus (USB) connector with optical functionality, the method comprising:

providing an optical-to-electrical/electrical-to-optical conversion module (OE module) in a housing of a USB connector adapted to communicate optical signals with a mating connector;

providing high-speed electrical connections in the USB connector that are electrically coupled on first ends thereof to electrical contacts of the OE module that are adapted to communicate electrical signals with the mating connector; and electrically coupling the high-speed electrical connections on second ends thereof disposed outside the housing to electrically conductive traces of a motherboard of a computer.

10. The method of claim 9, wherein the OE module comprises:

a printed circuit board (PCB) having a plurality of electrically conductive traces formed therein and having at least a first set of electrical contact pads disposed on a surface thereof, wherein at least some of the electrical contact pads of the first set are connected to at least some of the electrically conductive traces formed in the PCB;

at least a first integrated circuit (IC) mounted on a surface of the PCB, the first IC having electrical leads that are electrically coupled to one or more of the electrically conductive traces of the PCB;

at least a first laser diode mounted on a surface of the PCB and electrically connected to the first IC;

at least a first photodiode mounted on a surface of the PCB and electrically connected to the first IC; and an optical module mounted on a surface of the PCB, the optical module having at least first and second receptacles formed therein for receiving ends of first and second optical fibers, respectively, the optical module including an optical element configured to couple light between the first receptacle and the first laser diode and between the second receptacle and the first photodiode.

11. The method of claim 10, wherein the USB connector further comprises:

high-speed electrical contacts are electrically coupled to the first set of electrical contact pads, and wherein the high-speed electrical connections are electrically coupled on first ends thereof to the high-speed electrical contacts, and wherein second ends of the high-speed electrical connections are disposed outside of the housing of the USB connector to enable the second ends to be electrically coupled to one or more conductive traces of the motherboard of the computer.

12. The method of claim 11, wherein the first IC, the first laser diode, the first photodiode, and the optical module are mounted on an upper surface of the PCB near a first edge of the PCB.

13. The method of claim 12, wherein the first set of electrical contact pads are disposed on the upper surface of the PCB near a second edge of the PCB, wherein the second edge of the PCB is generally parallel to the first edge of the PCB.

14. The method of claim 13, wherein the OE module is secured within the housing in such a way that the upper surface of the PCB faces in a direction toward a bottom portion of the housing, and wherein the high-speed electrical contacts are disposed within the housing at a location between the top surface of the PCB and the bottom portion of the housing, and wherein the second ends of the high-speed electrical connections are disposed outside of the housing adjacent the bottom portion of the housing.

15. The method of claim 14, wherein a bottom surface of the PCB faces in a direction toward the top of the housing, and wherein the USB connector further comprises a lid attached to the upper portion of the housing adjacent the bottom surface of the PCB.

16. The method of claim 10, wherein the optical module has at least a first passive alignment feature disposed on a front surface of the optical module, and wherein the housing of the USB connector has at least a first passive alignment feature disposed in the housing, the first passive alignment features having shapes that are complimentary to one another such that the first passive alignment feature disposed on the optical module mates with the first passive alignment feature disposed in the housing.

17. The method of claim 16, wherein the optical module has at least a second passive alignment feature disposed on the front surface of the optical module, and wherein the housing has at least a second passive alignment feature disposed therein, the second passive alignment features having shapes that are complimentary to one another such that the second passive alignment feature disposed on the optical module mates with the second passive alignment feature disposed in the housing.

18. The method of claim 17, wherein the first and second receptacles are formed in the front surface of the optical module, and wherein the first and second passive alignment features disposed on the optical module are located on the front surface of the optical module near first and second side surfaces, respectively, of the optical module, and wherein the first and second receptacles are located in between the first and second alignment features disposed on the optical module.

* * * * *